(12) United States Patent
Hayakawa

(10) Patent No.: US 7,290,787 B2
(45) Date of Patent: Nov. 6, 2007

(54) OCCUPANT KNEE PROTECTION DEVICE FOR VEHICLE

(75) Inventor: Tatsuya Hayakawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 418 days.

(21) Appl. No.: 10/505,949

(22) PCT Filed: Feb. 19, 2003

(86) PCT No.: PCT/JP03/01747

§ 371 (c)(1),
(2), (4) Date: Aug. 27, 2004

(87) PCT Pub. No.: WO03/074332

PCT Pub. Date: Sep. 12, 2003

(65) Prior Publication Data

US 2005/0107729 A1    May 19, 2005

(30) Foreign Application Priority Data

Mar. 1, 2002    (JP) .............................. 2002-056363

(51) Int. Cl.
*B60R 21/16* (2006.01)
(52) U.S. Cl. ............................. 280/728.2; 280/730.1; 280/751; 280/753
(58) Field of Classification Search ................ 280/751, 280/752, 753, 730.1, 728.2
See application file for complete search history.

(56) References Cited

U.S. PATENT DOCUMENTS 4,978,136 A    12/1990    Tomita et al.
6,131,950 A    10/2000    Schröter

FOREIGN PATENT DOCUMENTS

| DE | 39 08 713 A1 | 10/1989 |
|---|---|---|
| DE | 199 50 944 A1 | 4/2001 |
| EP | 0 858 933 A1 | 8/1998 |
| JP | A 02-014945 | 1/1990 |
| JP | U 02-056053 | 4/1990 |
| JP | A 06-032195 | 2/1994 |
| JP | A 07-032962 | 2/1995 |
| JP | A 09-123857 | 5/1997 |
| JP | A 09-123863 | 5/1997 |
| JP | A 10-230812 | 9/1998 |
| JP | A 11-059302 | 3/1999 |
| JP | A 11-180238 | 7/1999 |
| JP | A 2003-040072 | 2/2003 |
| WO | WO 00/05105 | 2/2000 |

*Primary Examiner*—Eric Culbreth
(74) *Attorney, Agent, or Firm*—Oliff & Berridge, PLC

(57) ABSTRACT

An occupant knee protection apparatus for a vehicle includes a knee airbag 11 disposed in front of a knee portion B1, B2 of an occupant and configured to expand and deploy toward the knee portion B1, B2 of the occupant upon collision of the vehicle to thereby protect the knee portion B1, B2 of the occupant. The knee airbag 11 is attached to a panel 21 capable of absorbing energy. The panel 21 is connected to a support member of the vehicle; that is, an instrument-panel reinforcement 23, via brackets 22 capable of absorbing energy. The panel 21 is disposed in front of the knee portion B1 of the occupant at a vertical position where the knee portion B1 of the occupant can come into contact with the panel 21 when the occupant has a small build as compared with a standard build. The brackets 22 are disposed in front of the knee portion B2 of the occupant at a vertical position where the knee portion B2 of the occupant can come into contact with the brackets 22 when the occupant has the standard build or a large build as compared with the standard build.

3 Claims, 5 Drawing Sheets

OCCUPANT KNEE PROTECTION DEVICE FOR VEHICLE

TECHNICAL FIELD

The present invention relates to an airbag apparatus mounted on a vehicle, and more particularly to an occupant knee protection apparatus for a vehicle which includes a knee airbag disposed in front of a knee portion of an occupant and configured to expand and deploy toward the knee portion of the occupant upon collision of the vehicle (front collision) to thereby protect the knee portion of the occupant.

BACKGROUND ART

An occupant knee protection apparatus for a vehicle of such a type is disclosed in, for example, Japanese Patent Application Laid-Open (kokai) No. H9-123863. The patent publication discloses a leg protection apparatus in which a knee airbag module is connected to a reinforcement member within a vehicle by means of a bracket having a weakened portion that absorbs impact force through deformation.

In the leg protection apparatus of the above-mentioned patent publication, upon collision of the vehicle, the knee airbag expands and deploys toward a knee portion of an occupant to thereby receive an impact load of the knee portion of the occupant. Further, the bracket can receive a portion of the load which the knee airbag has failed to receive. However, the leg protection apparatus cannot sufficiently cope with variations in knee position or load stemming from variation in physique among possible occupants, and fails to optimally absorb energy.

DISCLOSURE OF THE INVENTION

The present invention provides an occupant knee protection apparatus for a vehicle which includes a knee airbag disposed in front of a knee portion of an occupant and configured to expand and deploy toward the knee portion of the occupant upon collision of the vehicle to thereby protect the knee portion of the occupant, the apparatus being characterized in that the knee airbag is attached to a panel capable of absorbing energy, the panel is connected to a support member of the vehicle via a bracket capable of absorbing energy, the panel is disposed in front of the knee portion of the occupant at a vertical position where the knee portion of the occupant can come into contact with the panel when the occupant has a small build as compared with a standard build, the bracket is disposed in front of the knee portion of the occupant at a vertical position where the knee portion of the occupant can come into contact with the bracket when the occupant has the standard build or a large build as compared with the standard build, and the bracket has an energy absorption load greater than that of the panel.

By virtue of the above-described configuration, upon collision of the vehicle, the knee airbag expands and deploys toward a knee portion of an occupant to thereby receive an impact load of the knee portion of the occupant. Further, a portion of the load which the knee airbag has failed to receive is received by the panel disposed in front of the knee portion of the occupant when the occupant has a small build as compared with the standard build, and is received by the bracket disposed in front of the knee portion of the occupant when the occupant has the standard build or a large build as compared with the standard build. Accordingly, the occupant knee protection apparatus can sufficiently cope with variations in knee positions or load stemming from variation in physique among possible occupants, and can optimally absorb energy.

Further, in this case, the energy absorption load of the bracket is set greater than that of the panel. Therefore, when the occupant has a small build as compared with the standard build (i.e., the occupant has a small mass and low body resistance to shock), energy absorption can be effected by means of the panel which deforms with small load, and when the occupant has the standard build, or a large build as compared with the standard build (i.e., the occupant has a large mass and high body resistance to shock), energy absorption can be effected by means of the bracket which deforms with high load. Therefore, the occupant knee protection apparatus can effectively protect the occupant within a limited space within the vehicle.

For practicing of the present invention, the knee airbag is preferably attached to the panel via an airbag case. The knee airbag and the airbag case can be commonly used among vehicles which have different body shapes and in which the shapes of the panel and the bracket may be changed in accordance with the position of an occupant or a design.

For practicing of the present invention, the airbag case is preferably attached to an opening portion of the panel, and an upper wall portion of the airbag case is superposed on a lower surface of an upper portion of an opening edge of the panel. This configuration is effected in the case where the apparatus is applied for the driver's seat. That is, even when the steering column, which moves forward upon collision of the vehicle, comes into contact with the panel or the airbag case, the steering column is unlikely to be caught by the upper wall portion of the airbag case, whereby smooth movement of the steering column is enabled.

BEST MODE FOR CARRYING OUT THE INVENTION

Figure 1:
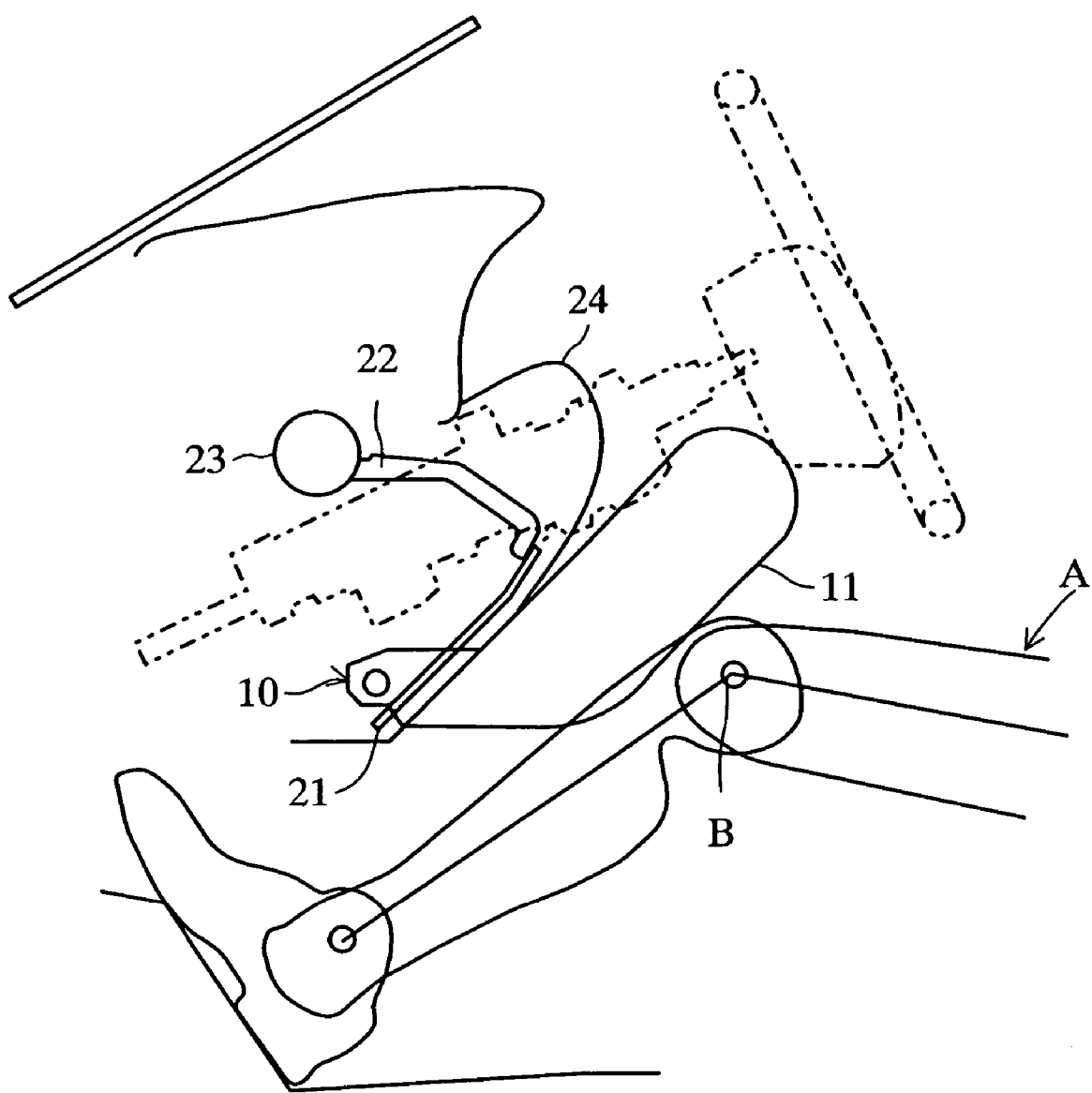
FIG. 1 is a side view schematically showing an embodiment of an occupant knee protection apparatus for a vehicle according to the present invention.

An embodiment of the present invention will now be described with the drawings. An occupant knee protection apparatus for a vehicle shown in FIGS. 1 to 5 can be applied to the driver's seat or the front passenger seat. The occupant knee protection apparatus includes a knee airbag module 10, which is disposed at a vertical position approximately identical with that of a knee portion B of an occupant A, and is attached to an instrument-panel reinforcement 23 via a panel 21, and paired right-hand and left-hand brackets 22. The knee airbag module 10 includes a knee airbag 11 capable of expanding and deploying in front of the knee portion B of the occupant A; an inflator 12 for supplying gas to the knee airbag 11 upon collision of the vehicle; and an airbag case 13 for accommodating the knee airbag 11 and the inflator 12.

Figure 4:
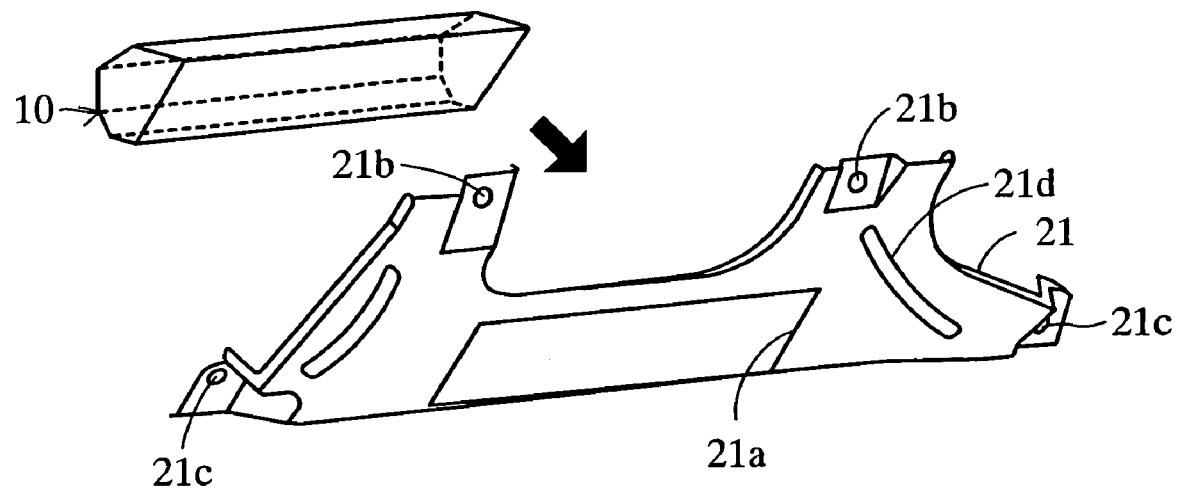
FIG. 4 is a perspective view showing the process of assembling the knee airbag module and the panel shown in FIG. 3.
Figure 5:
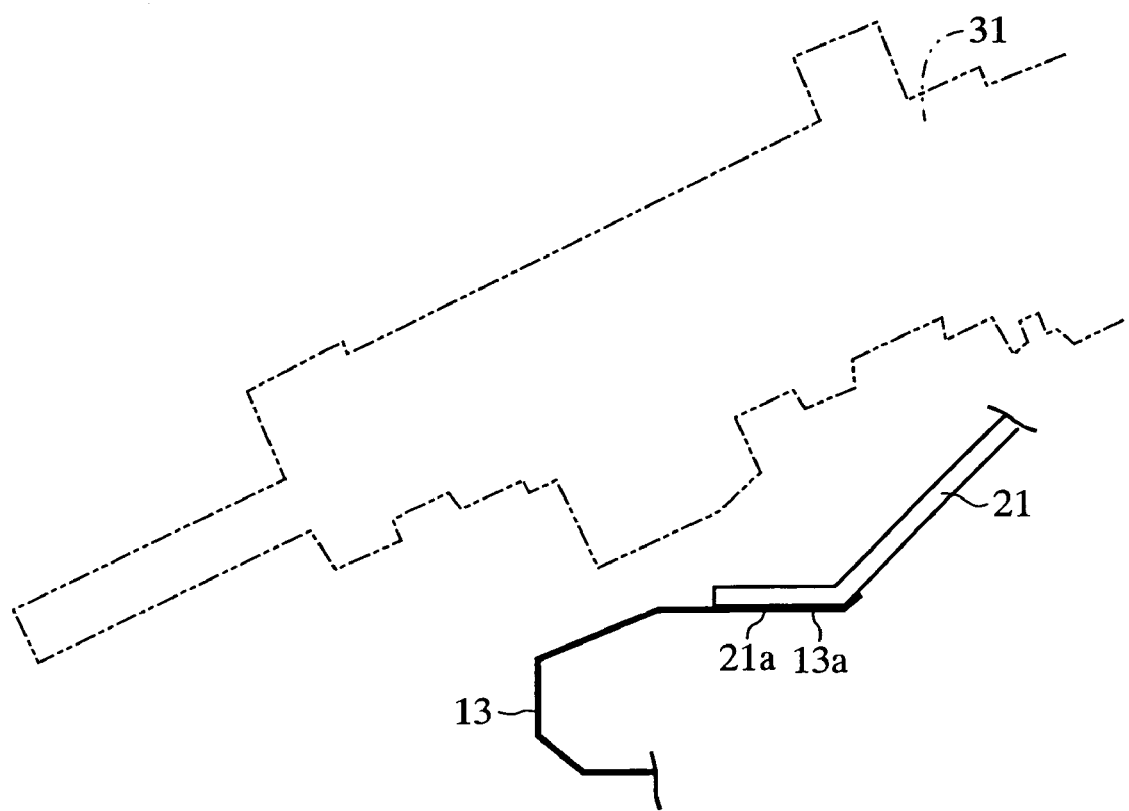
FIG. 5 is a vertically sectioned side view of a main portion showing the relation among the panel, the airbag case, and a steering column for the case where the occupant knee protection apparatus of the present invention is applied to the driver's seat.

The knee airbag 11 is formed of woven fabric, and is accommodated within the airbag case 13 in a folded condition. Upon collision of the vehicle, as shown in FIG. 1, the knee airbag 11 expands and deploys toward the knee portion B of the occupant A, to thereby protect the knee portion B of the occupant A. The inflator 12, which supplies and injects gas into the knee airbag 11 upon collision of the vehicle, is accommodated within the airbag case 13 together with the knee airbag 11. As shown in FIGS. 4 and 5, the airbag case 13 is attached to an opening portion 21a provided in a lower end portion of the panel 21, and the upper wall portion 13a of the airbag case 13 is superposed on the lower surface of an upper portion of the opening edge of the panel 21.

Figure 2:
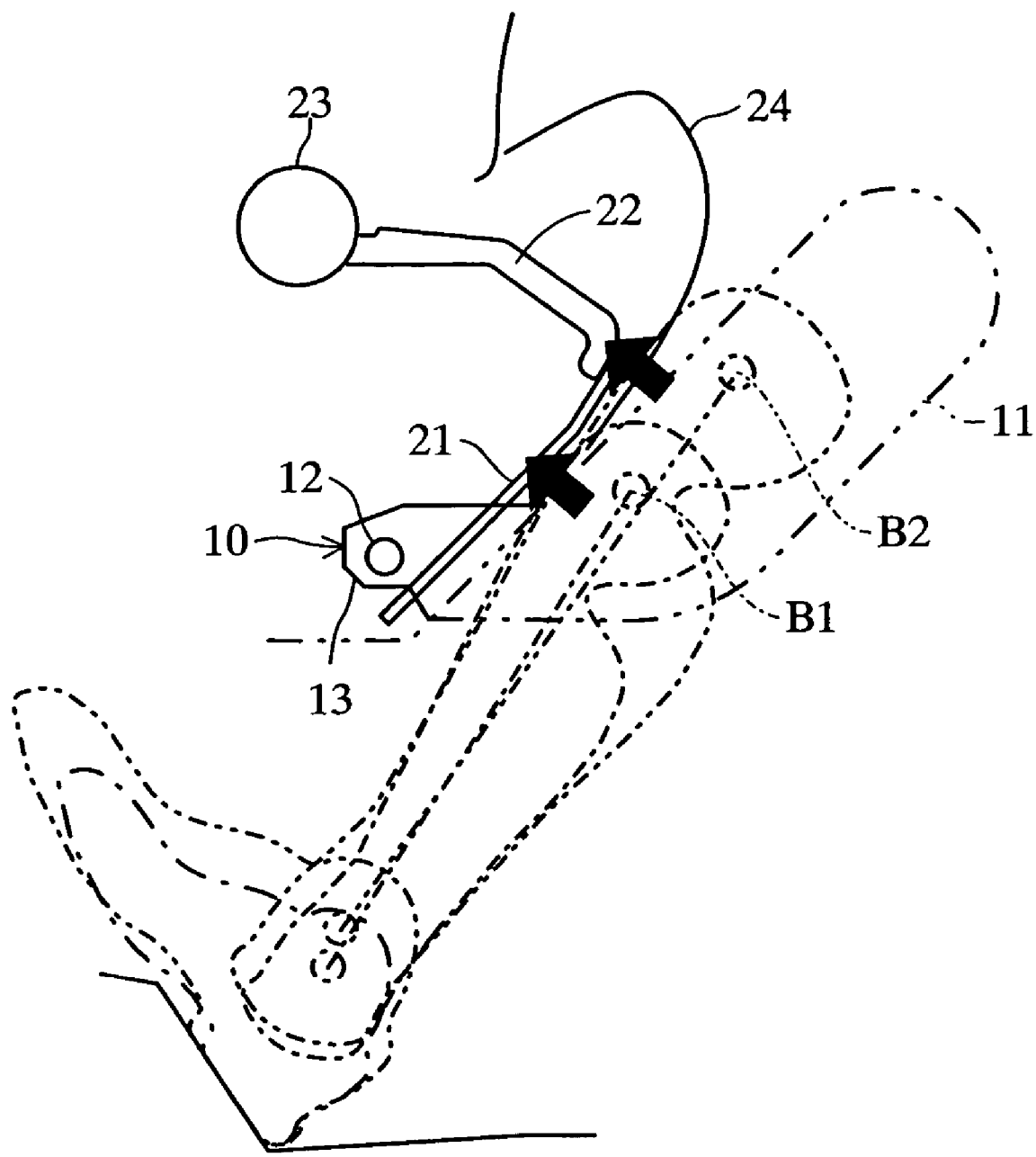
FIG. 2 is a side view showing the relation between the occupant knee protection apparatus shown in FIG. 1 and a knee portion of an occupant whose build is smaller than the standard build, as well as the relation between the occupant knee protection apparatus and a knee portion of an occupant whose build is equal to or larger than the standard build.
Figure 3:
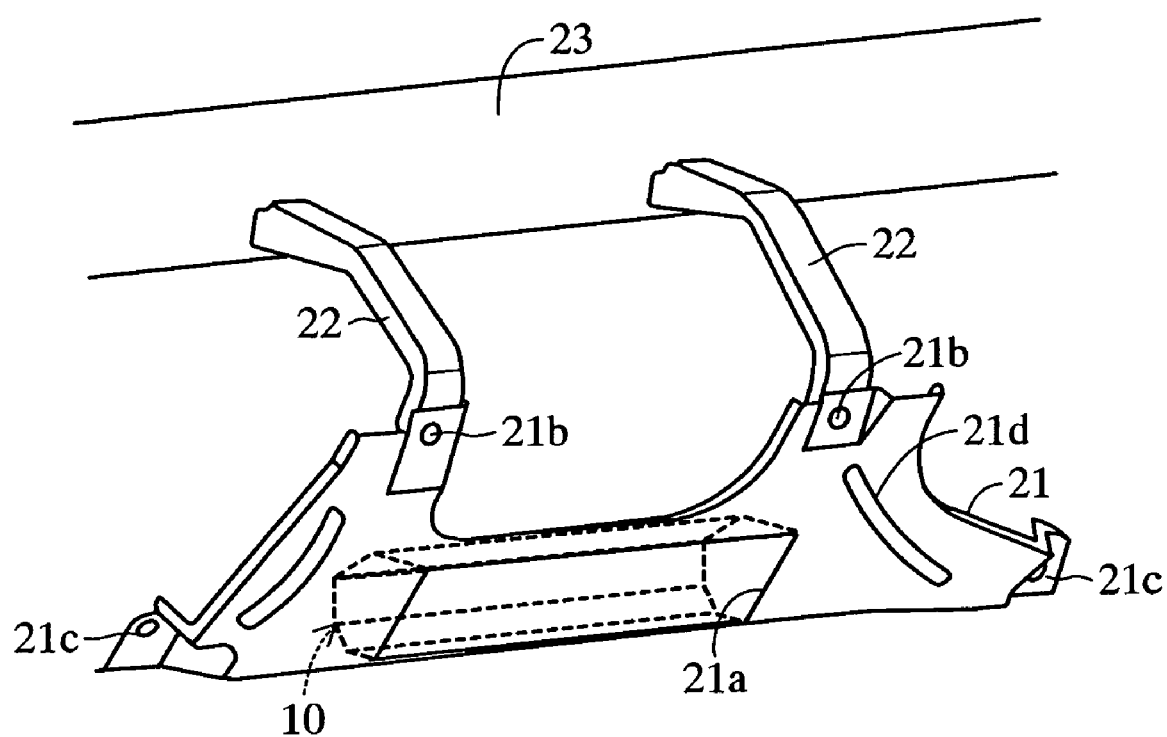
FIG. 3 is a perspective view showing the relation among the panel, the brackets, the instrument-panel reinforcement, and the occupant knee protection apparatus for a vehicle shown in FIG. 1.

The panel 21 is formed from a thin plate into a predetermined shape, and can absorb energy when it undergoes plastic deformation upon receipt of an energy absorption load F1. As shown in FIG. 2, the panel 21 is disposed in front of the position of a knee portion B1 of an occupant whose build is smaller than the standard build such that the knee portion B1 can come into contact with the panel 21. The occupant whose build is smaller than the standard build refers to, for example, a person having a small build which corresponds to a build of AF05 for public evaluation; i.e., a build which covers 5% of American adult women. Upper end attachment portions 21b of the panel 21 are connected to rear end portions of the corresponding brackets 22. Lower end attachment portions 21c of the panel 21 are connected to a lower end of an instrument panel 24. Vertically extending beads (bulged reinforcement portions) 21d are formed on the right-hand and left-hand end portions of the panel 21.

The brackets 22 are formed from a thick plate into a predetermined shape, and can absorb energy when undergoing plastic deformation upon receipt of an energy absorption load F2 (a load greater than the energy absorption load F1 of the panel 21). As shown in FIG. 2, the brackets 22 are disposed in front of the position of a knee portion B2 of an occupant who has the standard build or a build larger than the standard build such that the knee portion B2 can come into contact with the brackets 22. The occupant who has the standard build or a build larger than the standard build refers to, for example, a person having a large build which corresponds to a build of AM50 for public evaluation; i.e., a build which covers 50% of American adult men. The front ends of the brackets 22 are fixed to the instrument-panel reinforcement 23. The brackets 22 have two bent portions at an intermediate portion, at which the brackets 22 bend downward.

In the occupant knee protection apparatus of the present embodiment having the above-described configuration, in an ordinary state, the knee airbag 11 is accommodated within the airbag case 13 in a folded condition, and is covered by a rupturable lower portion of the instrument panel 24. In the present embodiment, when, upon a collision of the vehicle, a corresponding sensor (not shown) detects an acceleration greater than a preset value, the inflator 12 supplies gas into the knee airbag 11 in a folded condition. As the knee airbag 11 expands and deploys by the action of the supplied gas, as shown in FIG. 1, the knee airbag 11 enters the space between the knee portion B of the occupant A and the panel 21 and the brackets 22.

In the present embodiment, upon collision of the vehicle, the knee airbag 11 expands and deploys toward the knee portion B of the occupant A to thereby receive an impact load of the knee portion B of the occupant A. Further, when the occupant has a small build as compared with the standard build, a portion of the load which the knee airbag 11 has failed to receive is received by the panel 21 disposed in front of the knee portion B1 of the occupant, and then by the brackets 22. When the occupant has the standard build, or a larger build as compared with the standard build, the portion of the load which the knee airbag 11 has failed to receive is received by the brackets 22 disposed in front of the knee portion B2 of the occupant. Accordingly, the occupant knee protection apparatus can sufficiently cope with variations in knee positions B1, B2 or load stemming from variation in physique among possible occupants, and can optimally absorb energy. A reaction generated when the knee airbag 11 receives the impact load of the knee portion B of the occupant A is received by the instrument-panel reinforcement 23 via the panel 21 and the brackets 22.

In the present embodiment, the energy absorption load F2 of the brackets 22 is rendered greater than the energy absorption load F1 of the panel 21. Therefore, when the occupant has a small build as compared with the standard build (i.e., the occupant has a small mass and low body resistance to shock), energy absorption can be effected by means of the panel 21 which deforms with the small load F1, and when the occupant has the standard build or a large build as compared with the standard build (i.e., the occupant has a large mass and high body resistance to shock), energy absorption can be effected by means of the brackets 22 which deform with the high load F2. Therefore, the occupant knee protection apparatus can effectively protect the occupant within a limited space within the vehicle.

In the present embodiment, the knee airbag 11 is attached to the panel 21 via the airbag case 13. Therefore, the knee airbag 11 and the airbag case 13 can be commonly used among vehicles which have different body shapes and in which the shapes of the panel 21 and the brackets 22 may be changed in accordance with the position of an occupant or a design. Thus, the knee airbag module 10 can be commonly used among various vehicles.

In the present embodiment, the airbag case 13 is attached to the opening portion 21a of the panel 21, and, as shown in FIG. 5, the upper wall portion 13a of the airbag case 13 is superposed on a lower surface of the upper portion of the opening edge of the panel 21. This configuration is effected in the case where the apparatus is applied for the driver's seat. That is, even when a steering column 31 (indicated by an imaginary line in FIG. 5), which moves forward upon collision of the vehicle, comes into contact with the panel 21 or the airbag case 13, the steering column 31 is unlikely to be caught by the upper wall portion 13a of the airbag case 13, whereby smooth movement of the steering column 31 is enabled.

In the above-described embodiment, the airbag case 13 and the panel 21 are formed of separate members. However, the airbag case 13 may be formed integrally with the panel 21. In the above-described embodiment, the present invention is applied to the case where the inflator 12 is disposed within the knee airbag 11. However, the present invention can be applied to the case where an inflator is disposed outside a knee airbag, in the same manner as in the above-described embodiment, or with an appropriate modification.

The invention claimed is:

1. An occupant knee protection apparatus for a vehicle which includes a knee airbag disposed in front of a knee portion of an occupant and configured to expand and deploy toward the knee portion of the occupant upon collision of the vehicle to thereby protect the knee portion of the occupant, wherein the knee airbag is attached to a panel capable of undergoing plastic deformation when absorbing energy, the panel being connected to a support member of the vehicle via a bracket capable of absorbing energy when undergoing plastic deformation, the panel being disposed in front of the knee portion of the occupant at a vertical position whereby the knee portion of the occupant may transfer energy to the panel when the occupant's knee is disposed below the bracket and above the bottom edge of the panel, and the bracket being disposed in front of the knee portion of the occupant at a vertical position where the knee portion of the occupant may transfer energy to the bracket when the occupant's knee is disposed at or above the bracket, and the bracket absorbs energy at an energy absorption load greater than an energy absorption load at which the panel absorbs energy.

2. An occupant knee protection apparatus for a vehicle according to claim 1, wherein the knee airbag is attached to the panel via an airbag case.

3. An occupant knee protection apparatus for a vehicle according to claim 2, wherein the airbag case is attached to an opening portion of the panel, and an upper wall portion of the airbag case is superposed on a lower surface of an upper portion of an opening edge of the panel.

* * * * *

UNITED STATES PATENT AND TRADEMARK OFFICE
CERTIFICATE OF CORRECTION

PATENT NO. : 7,290,787 B2  Page 1 of 1
APPLICATION NO. : 10/505949
DATED : November 6, 2007
INVENTOR(S) : Tatsuya Hayakawa It is certified that error appears in the above-identified patent and that said Letters Patent is hereby corrected as shown below:

On the Title Page and Col. 1 Line 1
Item (54), line 1, please change "DEVICE" to --APPARATUS--.

Signed and Sealed this

Sixth Day of May, 2008

JON W. DUDAS
*Director of the United States Patent and Trademark Office*